UNITED STATES PATENT OFFICE.

WILLIAM H. ALLEN, OF DETROIT, MICHIGAN.

PROCESS FOR WEATHERPROOFING CLAY.

1,421,888.  Specification of Letters Patent.  Patented July 4, 1922.

No Drawing.  Application filed September 6, 1921. Serial No. 498,879.

*To all whom it may concern:*

Be it known that I, WILLIAM H. ALLEN, a citizen of the United States, and residing at Detroit, in the county of Wayne and State of Michigan, have invented a new and Improved Process for Weatherproofing Clay, of which the following is a specification.

This invention consists in a process for treating the surfaces of blocks or structures of raw or unbaked clay by depositing in its interstices an insoluble salt so as to destroy its capillarity and thus prepare the surfaces to receive paint, cement, stucco or other weather resistant coatings thereby to render the clay weatherproof. The use of this invention changes raw clay which has hitherto been held useless for building purposes in any but arid climates available for such use anywhere, and provides a cheap and universally prevalent building material which can be made use of by unskilled labor.

Ordinary clay when dried, unless it contains a too large admixture of sand, becomes very hard and has considerable crushing strength. Walls made up of this material may be built to considerable heights and will support heavy floors and roofs. But moisture penetrates freely and softens the clay so that it could not be used in moist climates. Because of this capillarity, it has been found almost impossible to paint surfaces of clay either while moist or dry, and plaster or stucco applied thereto soon scaled or fell off.

When clay has been built up into a wall, as by tamping between mold boards, the surfaces may be finished by the use of a trowel kept wet if desired, and ornaments or conventional patterns traced thereon. After the clay has dried to a greater or less extent, the surfaces exposed to the weather are sponged, brushed or sprayed with a solution of any soluble salt of an alkali earth metal, preferably a ten per cent solution of calcium chloride. When the moisture has evaporated the surface is treated in a similar manner with a solution of a silicate of sodium or potassium, preferably of twenty per cent strength. Both solutions are carried into the clay by its capillary property.

This spraying, sponging or brushing alternately is repeated until the surface no longer absorbs the solution owing to the deposit of calcium silicate and calcium hydrate in the interstices of the clay. The calcium hydrate rapidly absorbs carbon dioxid from the air.

After from twenty-four to forty-eight hours the surface thus treated may be painted, white-washed, plastered or given a coating of Portland cement to render the surface weather proof. Each of these coatings unites with the treated surface and thereafter the elements have substantially no effect on the coated clay. After the wall has dried out by the moisture therein escaping at the untreated inner surface, this surface may have its capillarity destroyed in a similar manner and then be plastered or painted in any desired manner to render the surface pleasing in appearance.

Other combinations such as calcium chloride and sodium aluminate or the fluo-silicates may be employed if desired. Where the clay contains no calcium carbonate soluble salts of alumina or iron may be used in conjunction with the soluble silicates.

I claim:—

1. The process of destroying the capillarity of the surface of a body of unbaked clay which consists in depositing in the interstices thereof an insoluble salt by chemical action.

2. The process of destroying the capillarity of the surface of a body of unbaked clay which consists in depositing calcium silicate in the interstices thereof by chemical action.

3. The process of rendering the surface of a body of unburned clay weather resistant which consists in filling the interstices thereof by chemical action with an insoluble salt, and then coating said surface with a weather resistant material.

4. The process of coating clay which consists in chemically destroying its capillarity and then applying a weather resistant medium.

5. The process of producing a weather resistant building material which consists in forming the building material out of clay, destroying the capillarity of its weather surface, and then coating said weather surface with Portland cement.

6. The process of coating clay which consists in alternately applying solutions of calcium chloride and of the silicate of an alkali earth metal until the surface no longer absorbs the solutions, and then applying a coating of Portland cement.

WILLIAM H. ALLEN.